No. 882,589. PATENTED MAR. 24, 1908.
C. S. SHARP.
DISK HARROW.
APPLICATION FILED DEC. 23, 1907.
3 SHEETS—SHEET 1.
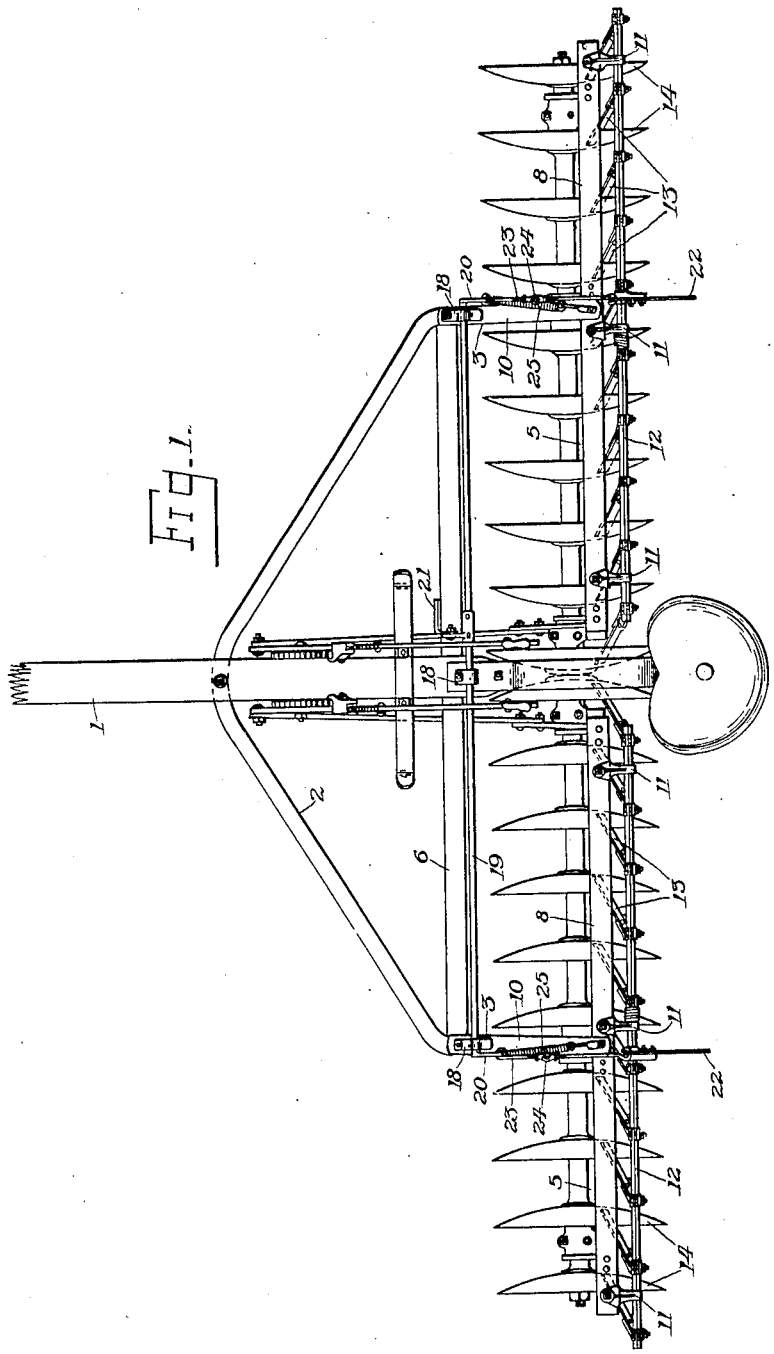
WITNESSES.
T. N. Daggett,
F. W. Hofmeister.
INVENTOR.
Charles S. Sharp,
By E. W. Burgess
ATTORNEY.

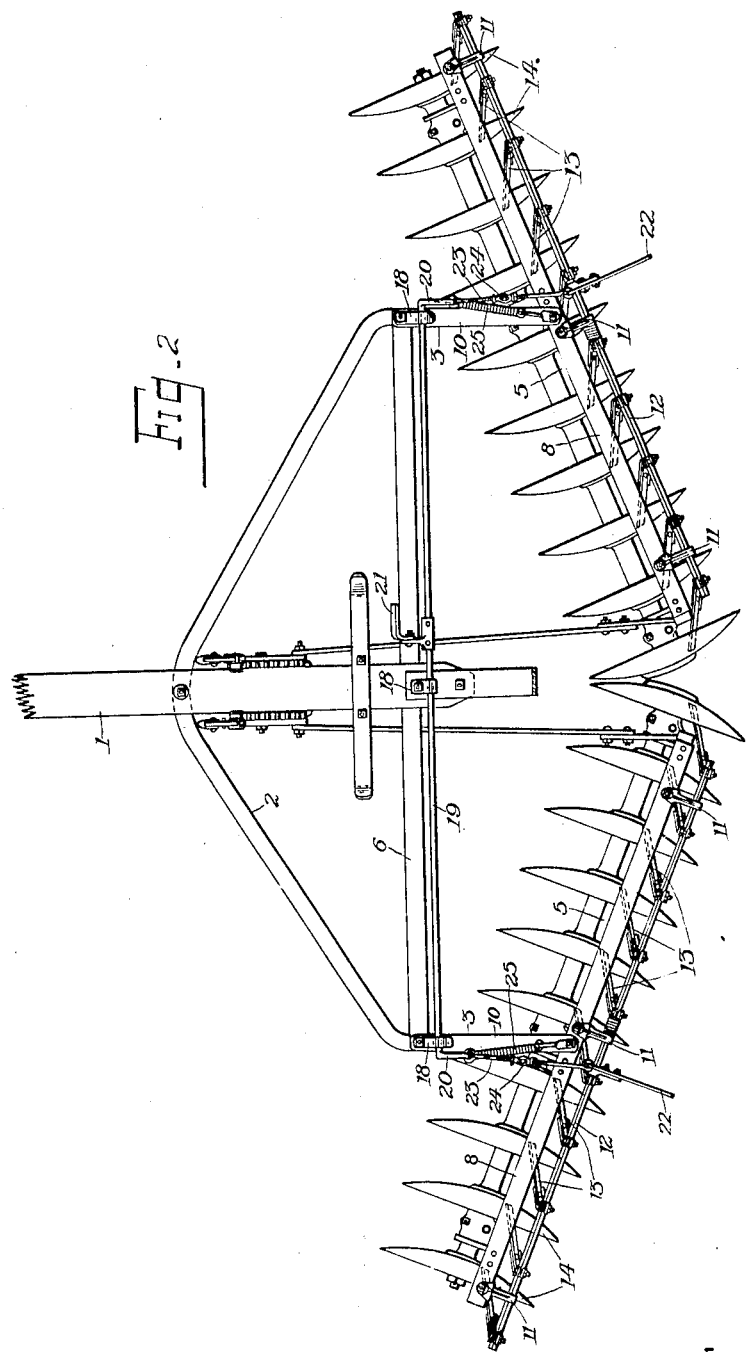

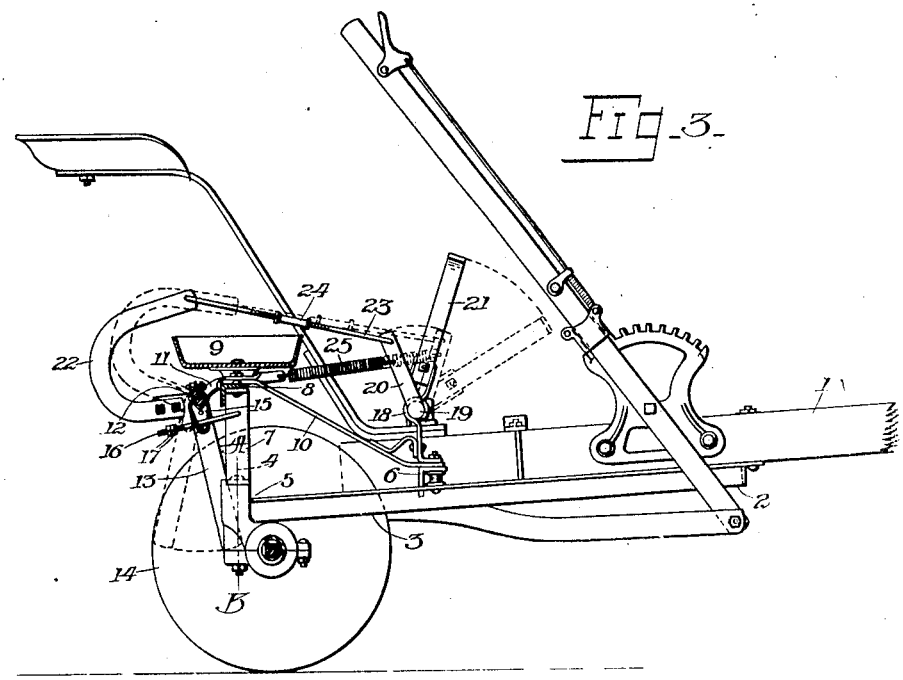

UNITED STATES PATENT OFFICE.

CHARLES S. SHARP, OF AUBURN, NEW YORK, ASSIGNOR TO INTERNATIONAL HARVESTER COMPANY, A CORPORATION OF NEW JERSEY.

DISK HARROW.

No. 882,589.  Specification of Letters Patent.  Patented March 24, 1908.

Application filed December 23, 1907. Serial No. 407,671.

*To all whom it may concern:*

Be it known that I, CHARLES S. SHARP, a citizen of the United States, residing at Auburn, in the county of Cayuga and State of New York, have invented certain new and useful Improvements in Disk Harrows, of which the following is a specification.

My invention relates to harrows of the disk type, and in particular to the manner of mounting the scrapers that engage with the disks in a manner to scrape therefrom any adhering material that would otherwise operate to impair their efficiency; its object being to provide means whereby the above result may be attained in a satisfactory and convenient manner. I attain this object by the mechanism illustrated in the accompanying drawing, in which—

Figure 1 represents a plan view of a harrow having pivoted gangs connected with a draft frame and having my invention forming a part thereof. Fig. 2 represents a plan view of a like harrow having the disk gangs angularly adjusted; and Fig. 3 represents an end elevation, partly in section, of Fig. 1.

Like reference numerals designate the same parts throughout the several views.

Referring to the drawings, 1 designates the tongue, 2 a draft frame member having its forward portion secured to the tongue and side members 3 thereof extending rearward and pivotally connected at 4 by means of vertically arranged pivots, as represented by line A—B of Fig. 3, to gang frames 5, and 6 is a supplemental draft frame member secured to the tongue and having its opposite ends secured to side members 3.

7 represents vertical members forming part of the gang frames, and 8 longitudinal members secured to the upper ends of the vertical members, and 9 represents weight boxes secured thereto, and brace members 10 have their opposite ends secured to the gang frame members 8 and to the supplemental draft frame member 6.

Secured to frame members 8 are rearwardly extending brackets 11, and 12 designates rock-shafts journaled in said bearings.

13 represents scrapers secured to said rock-shafts and adapted to contact with the individual disks 14 of each gang in a manner to remove any material that may adhere thereto, as the scrapers are caused to swing rearward at their lower ends by a rocking movement of said shafts, as shown by dotted lines in Fig. 3.

Secured to the rock-shafts are depending arms 15, and 16 designates links having their inner ends pivotally connected with the gang frame and being loosely received by openings in arms 15, are provided with nuts 17 at their outer ends, by means of which the effective movement of the scrapers rearward may be regulated.

Mounted in bearings 18, secured to the draft frame, is a rocker-bar 19, having crank arms 20 at opposite ends thereof, and a foot lever 21 secured thereto at one side of its center within convenient reach of the operator's foot.

Lever arms 22 are secured to rock-shafts 12; said arms being extended rearward and upward and curved in a manner having their upper ends overhanging the weight boxes and near the vertical axes of the pivotal connection between the gang and draft frames; the curved portion of the arms allowing a movement thereof sufficient to operate the scrapers without contacting with the weight boxes.

The upper ends of the lever arms are connected with the crank arms 20 by means of links 23, that may be lengthened or shortened by means of turn buckles 24. Coiled springs 25 are connected with crank-arms 20 and the gang frames and operate to rock the bar 19 and rock-shafts 12 in a direction to cause the scrapers to swing forward at their lower ends toward the axes of the disks.

By means of the construction as described, having the lever arms 22 secured to the rock-shafts 12 at or near their central part, the torsional strain upon said shafts is divided and smaller shafts may be used, and by means of the rocker-bar 19 both rock-shafts may be operated simultaneously to effect a cleaning movement of the scrapers.

What I claim as my invention, and desire to secure by Letters Patent, is:

1. A harrow having, in combination, a draft-frame, a plurality of gang-frames connected with said draft-frame, disks mounted in said gang-frames, rock-shafts mounted in bearings upon said gang frames, scrapers secured to said rock-shafts and adapted to engage with said disks, lever arms secured to said rock-shafts, a rocker-bar mounted in bearings upon said draft-frame, said rocker-bar having crank arms at opposite ends thereof, link connections between said crank-arms and said lever-arms, and means whereby said rocker-bar may be rocked in its bearings.

2. A harrow having, in combination, a draft-frame, gang-frames connected with said draft-frame by means of vertically arranged pivots, disks mounted in said gang-frames, rock-shafts mounted in bearings upon said gang-frames, scrapers secured to said rock-shafts and adapted to engage with said disks, lever-arms secured to said rock-shafts, the outer ends of said arms being substantially in line with the axes of the pivotal connections of the draft-frame and gang-frames, a rocker-bar mounted in bearings upon said draft-frame, said rocker-bar having crank-arms at opposite ends thereof, link connections between said crank-arms and the outer ends of said lever-arms, and means whereby said rocker-bar may be rocked in its bearings.

3. A harrow having, in combination, a draft-frame, gang-frames connected with said draft-frame by means of vertically arranged pivots, disks mounted in said gang-frames, rock-shafts mounted in bearings upon said gang-frames, scrapers secured to said rock-shafts and adapted to engage with said disks, lever-arms secured to said rock-shafts, the outer ends of said arms being substantially in line with the axes of the pivotal connections of the draft-frame and gang-frames, a rocker-bar mounted in bearings upon said draft-frame, said rocker-bar having crank-arms at opposite ends thereof, coiled springs connecting said crank-arms with said gang-frame in a manner to rock said bar in one direction, adjustable link connections between said crank arms and the outer ends of said lever-arms, and means whereby said rocker-bar may be rocked in its bearings against the action of said springs.

4. A harrow having, in combination, a draft-frame, gang-frames connected with said draft-frames by means of vertically arranged pivots, disks mounted in said gang-frames, rock-shafts mounted in bearings upon said gang-frames, scrapers secured to said rock-shafts and adapted to engage with said disks, arms secured to said rock-shafts, adjustable link connections between said arms and said gang-frames whereby a rocking movement of said shafts may be controlled in one direction, curved lever-arms secured to said rock-shafts, the outer ends of said arms being substantially in line with the axes of the pivotal connections of the draft-frames and gang-frames, a rocker-bar mounted in bearings upon said draft-frame, said rocker-bar having crank-arms at opposite ends thereof, coiled springs connecting said crank-arms with said gang-frames in a manner to rock said bar in one direction, adjustable link connections between said crank-arms and the outer ends of said curved lever-arms, and a foot lever secured to said rocker-bar intermediate said crank-arms whereby said bar may be rocked in its bearings against the action of said springs.

CHARLES S. SHARP.

Witnesses:
K. T. ELLIOTT,
F. T. O'BRIEN.